United States Patent
VanValkenburgh

(10) Patent No.: US 10,139,015 B2
(45) Date of Patent: Nov. 27, 2018

(54) HOLDER WITH LINER FOR A ROD

(71) Applicant: Pit Bull Products, Inc., Huntsville, AL (US)

(72) Inventor: Charles VanValkenburgh, Huntsville, AL (US)

(*) Notice: Subject to any disclaimer, the term of this patent is extended or adjusted under 35 U.S.C. 154(b) by 0 days.

(21) Appl. No.: 14/589,104

(22) Filed: Jan. 5, 2015

(65) Prior Publication Data

US 2016/0195200 A1  Jul. 7, 2016

(51) Int. Cl.
  *F16L 3/02*   (2006.01)
  *F16M 13/02*  (2006.01)
  *F16M 11/04*  (2006.01)

(52) U.S. Cl.
  CPC ............ *F16L 3/02* (2013.01); *F16M 11/041* (2013.01); *F16M 13/02* (2013.01)

(58) Field of Classification Search
  CPC ....... F16L 3/02; F16L 3/08; F16L 3/12; F16L 3/1218; F16L 3/123; F16L 3/1236; F16L 3/13; F16L 3/221
  USPC ................................ 248/73, 74.1, 74.2, 340
  See application file for complete search history.

(56) References Cited

U.S. PATENT DOCUMENTS

| | | | | |
|---|---|---|---|---|
| 1,678,353 A | * | 7/1928 | Reach | A47F 7/0028 211/70.2 |
| 1,997,490 A | * | 4/1935 | Hoar | A47B 61/003 211/124 |
| D150,507 S | * | 8/1948 | McEntire | 248/314 |
| 2,458,670 A | * | 1/1949 | Young, Jr. | F16L 3/02 24/535 |
| D168,850 S | * | 2/1953 | Monroe | D6/552 |
| 2,860,717 A | * | 11/1958 | Jedrzykowski | B60K 25/00 180/53.5 |
| 3,080,140 A | * | 3/1963 | Gohs | F16L 3/08 248/74.1 |
| 3,366,356 A | * | 1/1968 | Fisher | F16B 9/02 16/2.1 |
| 3,894,706 A | * | 7/1975 | Mizusawa | F16L 3/1025 248/68.1 |
| D275,346 S | * | 9/1984 | Padgett | D6/552 |
| 4,805,479 A | * | 2/1989 | Brightwell | F16C 1/105 74/502.4 |

(Continued)

FOREIGN PATENT DOCUMENTS

| | | | | |
|---|---|---|---|---|
| CA | 2387826 A1 | * | 11/2002 | F16B 21/084 |
| DE | 102008021021 A1 | * | 10/2009 | B29C 45/1645 |
| GB | 2485844 B | * | 3/2013 | F16L 3/1075 |

*Primary Examiner* — Jonathan Liu
*Assistant Examiner* — Guang H Guan
(74) *Attorney, Agent, or Firm* — Adam K. Sacharoff; Much Schelist, P.C.

(57) ABSTRACT

An apparatus for engaging a rod is defined to include a frame, at least one arm extending from the frame and a liner fitted within each arm. The frame is configured to be secured to a surface. The at least one arm includes a U-shaped channel having legs curved into a base of the channel, and further includes an overhang lip extending over each leg. The liner includes a U-shaped profile defined to have a pair of legs extending into a base of the liner, and further includes an outside edge of the liner is grooved to define a pair of opposing flanges extending from the liner and configured to frictionally engage the U-shaped channel. Wherein when the liner is installed in the channel the overhang lips extending over the legs of the liner.

3 Claims, 6 Drawing Sheets

(56) References Cited

U.S. PATENT DOCUMENTS

| | | | | |
|---|---|---|---|---|
| 4,978,090 A * | 12/1990 | Wichert | ................ | F16L 3/1041 248/316.5 |
| 5,156,491 A * | 10/1992 | Russell | .................. | F16L 3/237 248/49 |
| 5,435,506 A * | 7/1995 | Wiley | ....................... | F16L 3/10 248/74.1 |
| 5,577,697 A * | 11/1996 | Accordino | ............ | F16M 13/02 248/206.5 |
| D390,013 S * | 2/1998 | Ho | ................................ | D6/323 |
| 6,264,147 B1 * | 7/2001 | Mitchell | ................ | A47L 13/512 211/66 |
| 6,276,108 B1 * | 8/2001 | Padrun | .................... | E04C 5/167 52/677 |
| 6,330,950 B1 * | 12/2001 | Loika | .................... | A47F 7/0021 211/85.7 |
| D458,789 S * | 6/2002 | Loika | ............................ | D6/552 |
| 6,412,735 B1 * | 7/2002 | Mathieu | ................... | A47K 1/09 211/66 |
| 6,910,309 B2 * | 6/2005 | Trangsrud | ................ | E04C 5/20 52/684 |
| 6,926,237 B2 * | 8/2005 | Shereyk | ................ | F16B 5/0685 248/71 |
| 7,278,190 B2 * | 10/2007 | Fischer | .................... | F16L 3/13 24/530 |
| 7,441,669 B1 * | 10/2008 | Dalbey | ................. | A47F 7/0028 211/60.1 |
| D597,402 S * | 8/2009 | Garza | ................ | E04C 5/167 D8/354 |
| D601,841 S * | 10/2009 | Neufeld | ......................... | D6/570 |
| 7,770,848 B2 * | 8/2010 | Johnson | ................ | F16L 3/1207 248/65 |
| 8,353,486 B2 * | 1/2013 | Osborn | ..................... | F16L 3/04 248/228.1 |
| 8,578,571 B2 * | 11/2013 | Schmidt | .................. | F16B 2/005 24/536 |
| 8,807,501 B2 * | 8/2014 | Chung | .................... | B25H 3/04 211/70.8 |
| 8,876,067 B2 * | 11/2014 | McAllister | .............. | F16L 41/12 239/283 |
| 8,919,707 B2 * | 12/2014 | Lee | ........................ | H02G 3/30 248/56 |
| 9,273,802 B2 * | 3/2016 | Allendorf | ................ | F16L 3/02 |
| 9,400,117 B2 * | 7/2016 | Jacobs | ................... | F24D 3/141 |
| 2002/0179780 A1 * | 12/2002 | Benoit | .................. | F16B 21/084 248/73 |
| 2004/0115004 A1 * | 6/2004 | Serrano | .................... | F16L 3/02 405/157 |
| 2007/0187556 A1 * | 8/2007 | Yoshitake | ................ | F16L 3/02 248/58 |
| 2011/0154623 A1 * | 6/2011 | Schmidt | .................. | F16B 2/005 24/457 |
| 2012/0061529 A1 * | 3/2012 | Hill | .......................... | H01R 4/48 248/65 |
| 2013/0256471 A1 * | 10/2013 | Ruiz | ........................ | H02G 3/30 248/74.2 |
| 2014/0001328 A1 * | 1/2014 | Chung | .................. | F16M 13/02 248/231.91 |
| 2015/0157785 A1 * | 6/2015 | Hilliard | ............... | A61M 5/1415 248/49 |

* cited by examiner

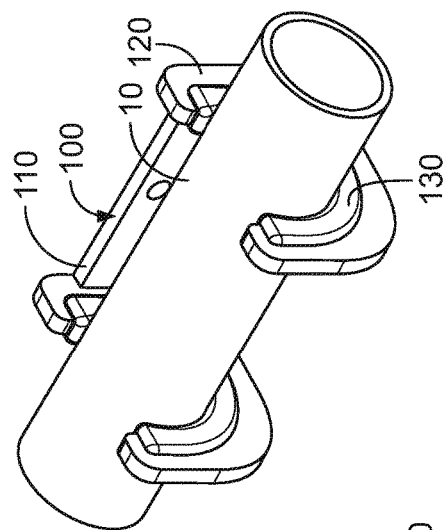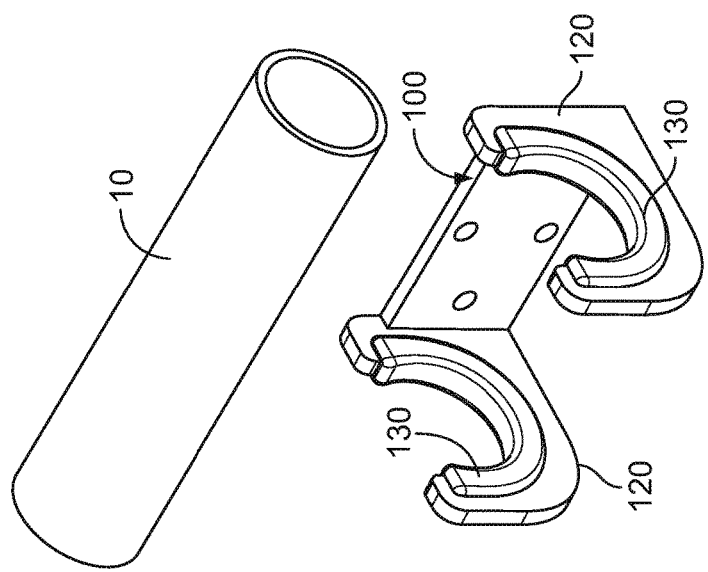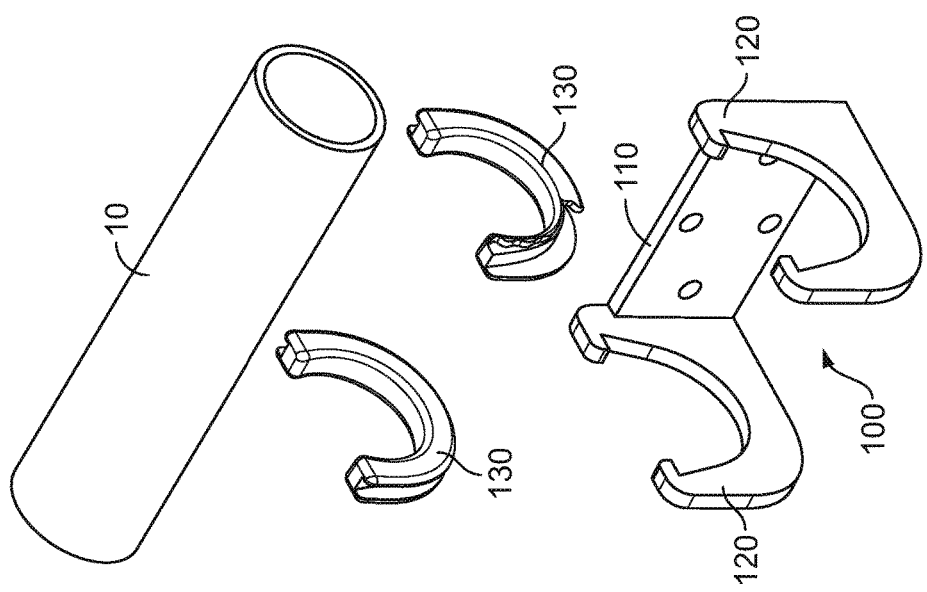

HOLDER WITH LINER FOR A ROD

BACKGROUND OF THE INVENTION

The present invention relates generally to a grip liner which can be used in connection with a plated or painted pipe, tube, conduit, rod, shaft, or any other generally shaped object (generally referred to herein as a rod) to help prevent the plating or paint from scratching or pealing.

There are a variety of rods used in every industry and often these are plated, painted, or coated either for design or functional purposes. When attaching to the rod such as a clamp or other type of vice, the plaiting or paint can become scratched or chipped. This leaves an unsightly rod when the clamp or vice is separated therefrom. In addition, if coated for a particular purpose the removal of the coating could cause issues or structural problems.

The present invention is directed to allow a rod to be secured to a secondary object through a liner invented as described and shown.

BRIEF SUMMARY OF THE INVENTION

The present invention includes in one embodiment an apparatus for engaging a rod is defined to include a frame, at least one arm extending from the frame and a liner fitted within each arm. The frame is configured to be secured to a surface. The at least one arm includes a U-shaped channel having legs curved into a base of the channel, and further includes an overhang lip extending over each leg. The liner includes a U-shaped profile defined to have a pair of legs extending into a base of the liner, and further includes an outside edge of the liner is grooved to define a pair of opposing flanges extending from the liner and configured to frictionally engage the U-shaped channel. Wherein when the liner is installed in the channel the overhang lips extending over the legs of the liner.

In another aspect the legs of the U-shaped channel extend at about a 15° angle, while the legs of the U-shaped liner extend at about a 10° angle. In another aspect, the frame has ends distal from each other and the at least one arm comprising at least a pair of arms separately extending from the ends of the frame.

In another embodiment of the invention there is provided a holder for engaging a rod defined to include at least one arm having a U-shaped channel, the U-shaped channel configured to have legs curved into a base of the channel; and further including a liner fitted within each U-shaped channel, each liner includes: a U-shaped profile defined to have a pair of legs extending into a base of the liner, and further includes an outside edge of the liner is grooved to define a pair of opposing flanges extending from the liner and configured to frictionally engage the U-shaped channel.

BRIEF DESCRIPTION OF THE DRAWINGS

A fuller understanding of the foregoing may be had by reference to the accompanying drawings, wherein:

FIGS. 3A, 3B, and 3C illustrate in various views the holder with liner from FIG. 1 and illustrating the pipe positioned in the holder in accordance with an embodiment of the invention;

DETAILED DESCRIPTION OF THE INVENTION

Figure 1:
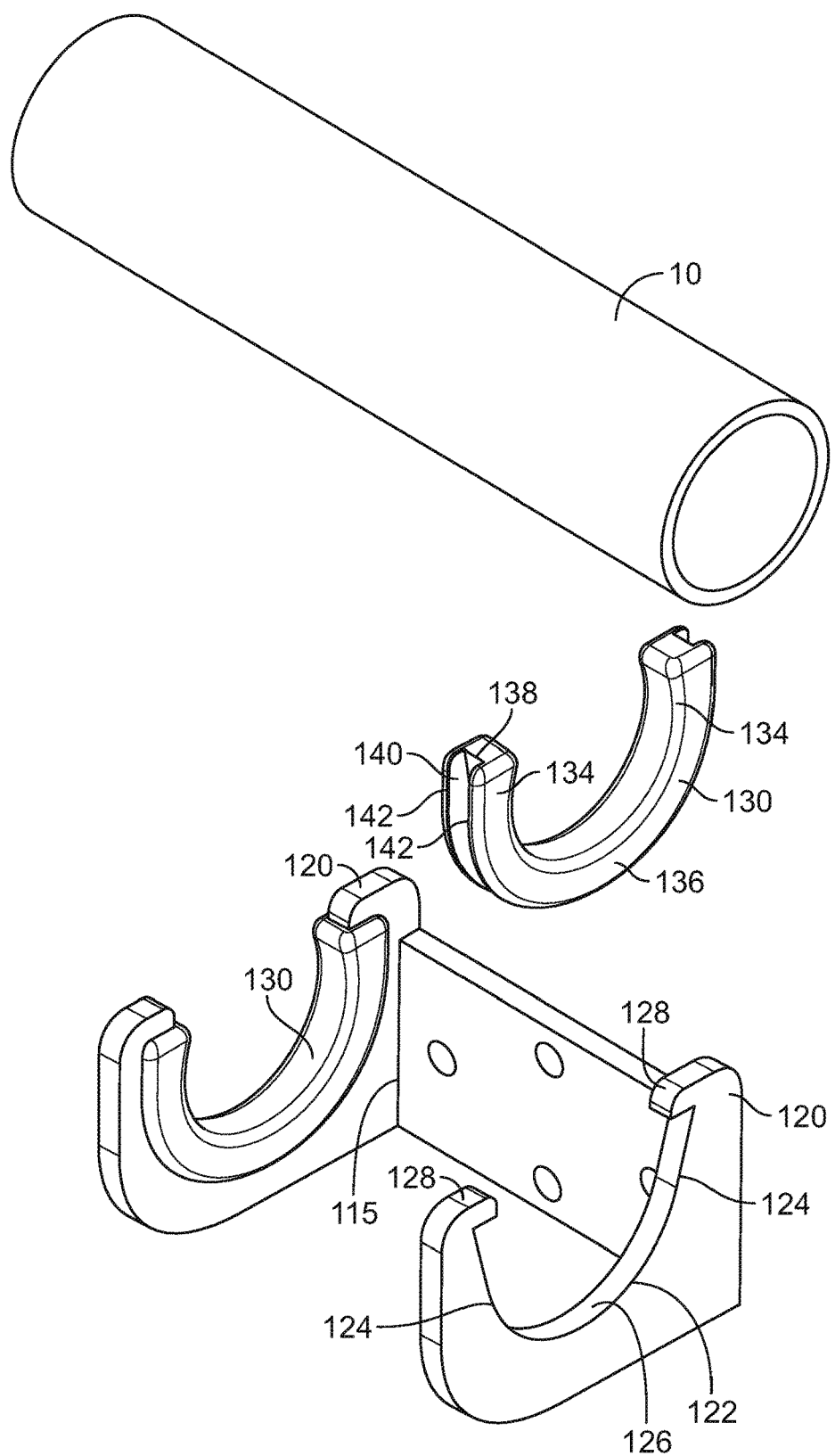
FIG. 1 illustrates a holder with a liner for use with a pipe or conduit in accordance with an embodiment of the invention.
Figure 2:
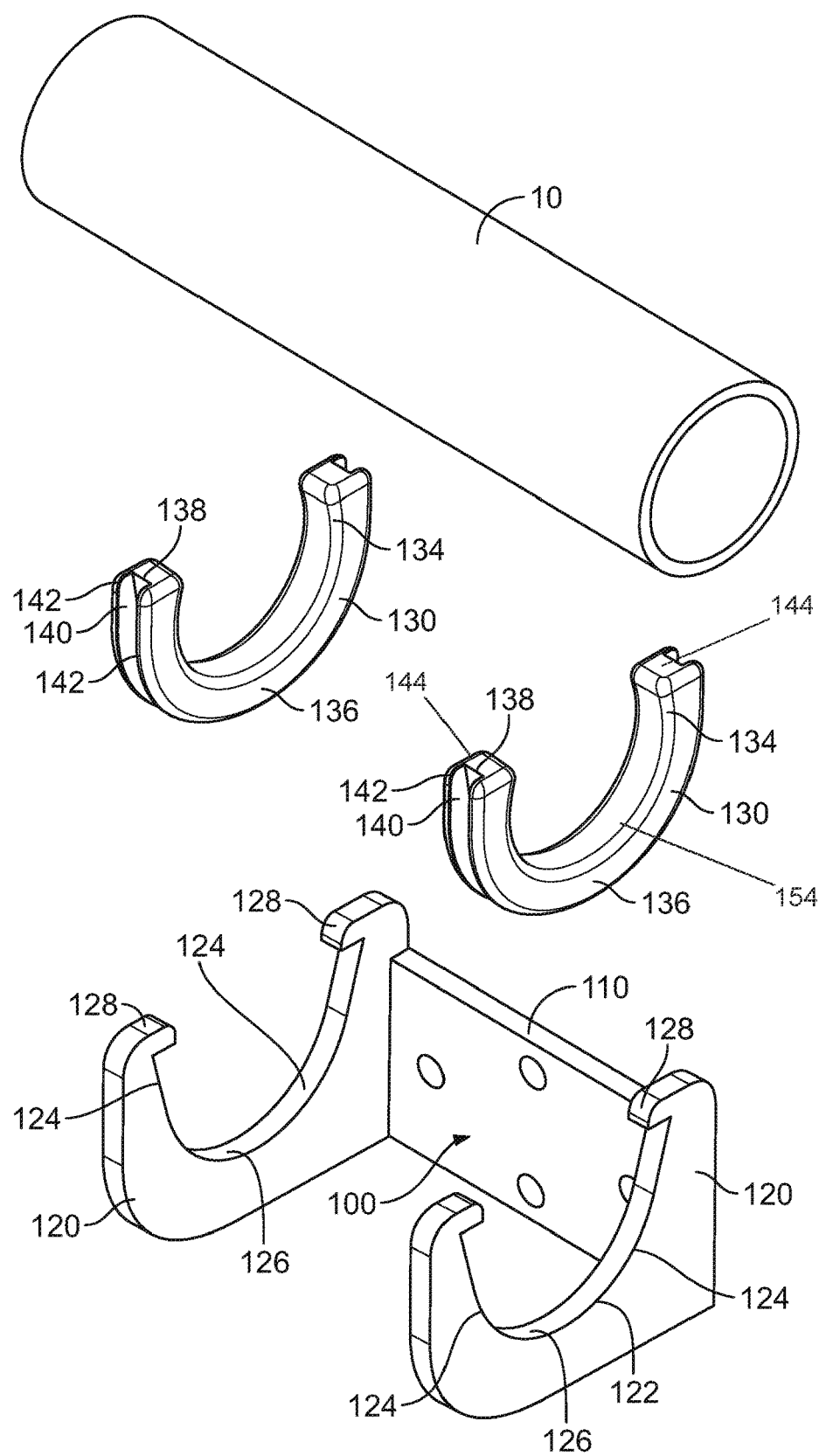
FIG. 2 illustrates in an exploded view the holder with liner from FIG. 1 in accordance with an embodiment of the invention.

Referring now to FIGS. 1-8, a holder 100 is illustrated for receiving, holding and generally engaging a pipe, tube, conduit, rod, shaft, or any other generally shaped object (generally referred in the description and claims as a rod 10). The holder 100 includes a frame 110 that can be secured to a surface. The frame 110 includes ends 115 distal from each other. Extending from the frame is one or more arms 120. As illustrated, each end of the frame 110 may include an arm, however, it is within the scope of the invention to simply provide a single arm or even a plurality of arms extending along the base or certain spaced intervals from each other. Each arm 120 includes a U-shaped channel 122 that has the legs 124 extending into the base 126 of the channel. In one aspect, the legs 124 may taper or angle into the base 126 at or around a 15° angle. In another aspect, the, the legs 124 may include an overhang lip 128 extending at the beginning of the legs 124.

Fitted within each U shaped channel 122 is a liner 130. The liner has a U-shaped profile to correspond to the channel 122. The liner thus includes a pair of legs 134 that extend into the base 13$ of the liner. The outside edge 138 of the liner 122 is grooved 140 to create a pair of opposing flanges 142 extending from the liner and defined to frictionally engage the U-shaped channel 122 when installed. When installed the overhang lips 128 rest on top of the liner top edges 144. In addition, the legs 134 of the liner may be tapered at or around a 10° angle. Creating a difference in angle between the liner and the channel may help create a more defined grip onto a pipe or conduit when positioned in the liner.

Figure 4:
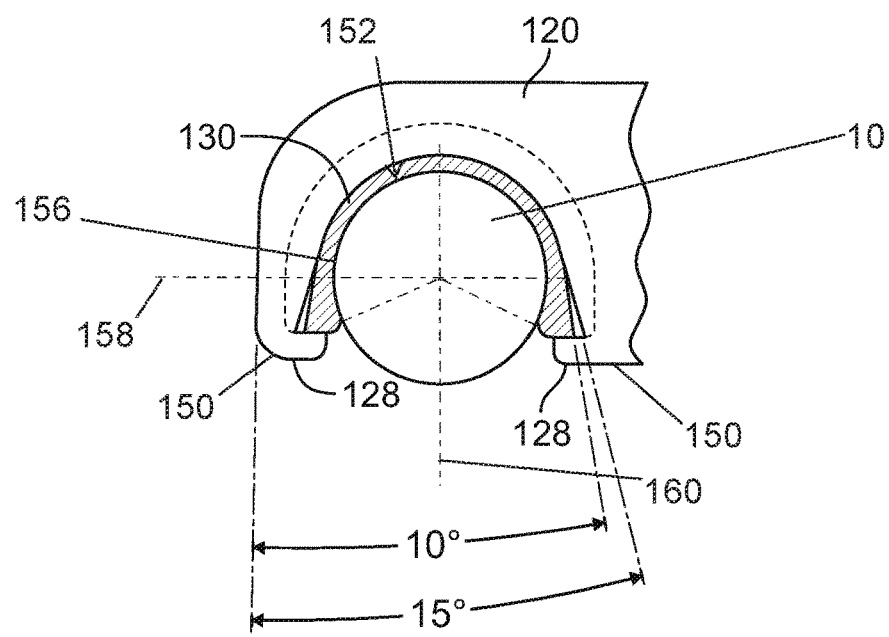
FIG. 4 illustrates as a cross sectional view the holder with liner from FIG. 1 in accordance with an embodiment of the invention.
Figure 5:
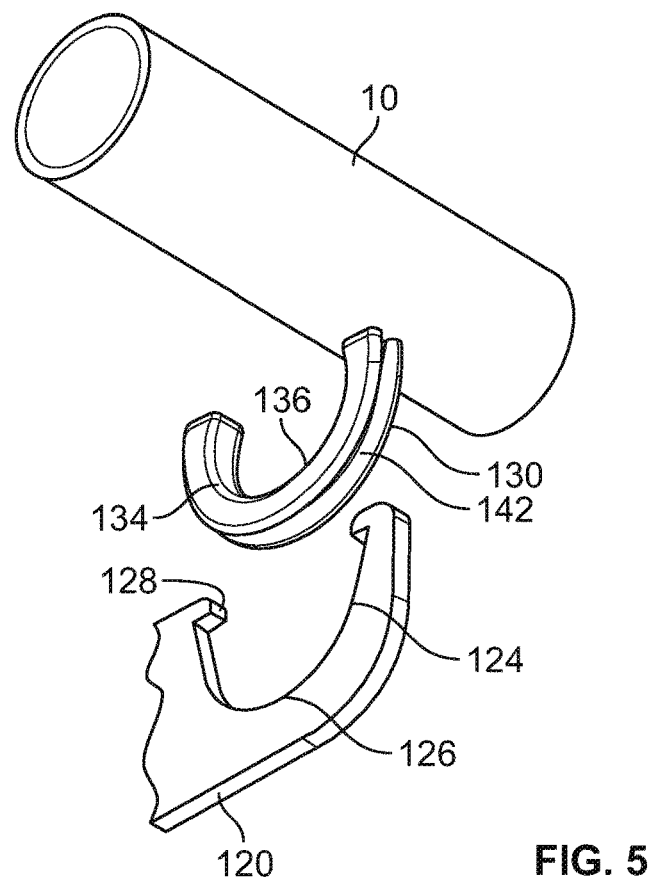
FIG. 5 illustrates another embodiment of the invention showing an arm with a liner.
Figure 6:
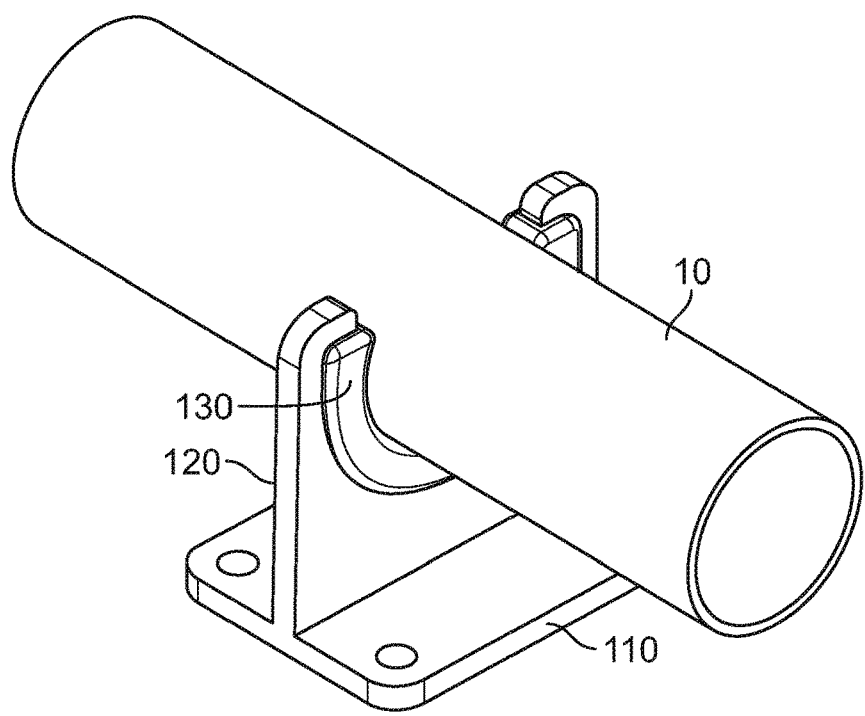
FIG. 6 illustrates another embodiment of the invention showing an arm secured to a wall or surface.
Figure 7:
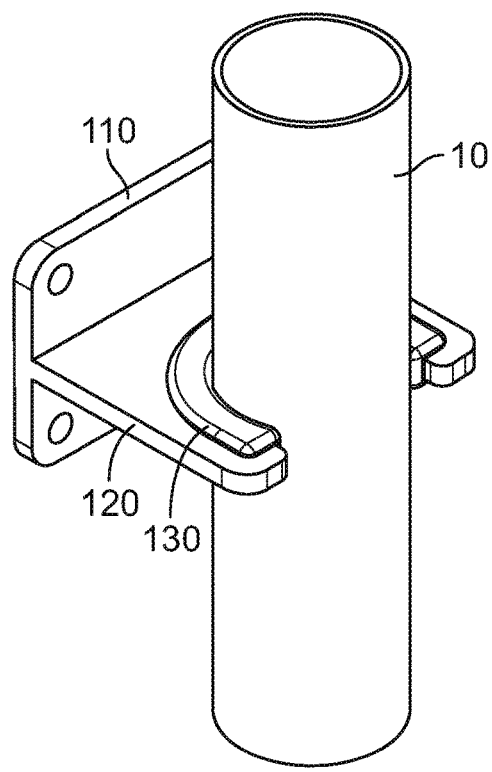
FIG. 7 illustrates another embodiment of the invention showing an arm secured to a floor or surface.
Figure 8:
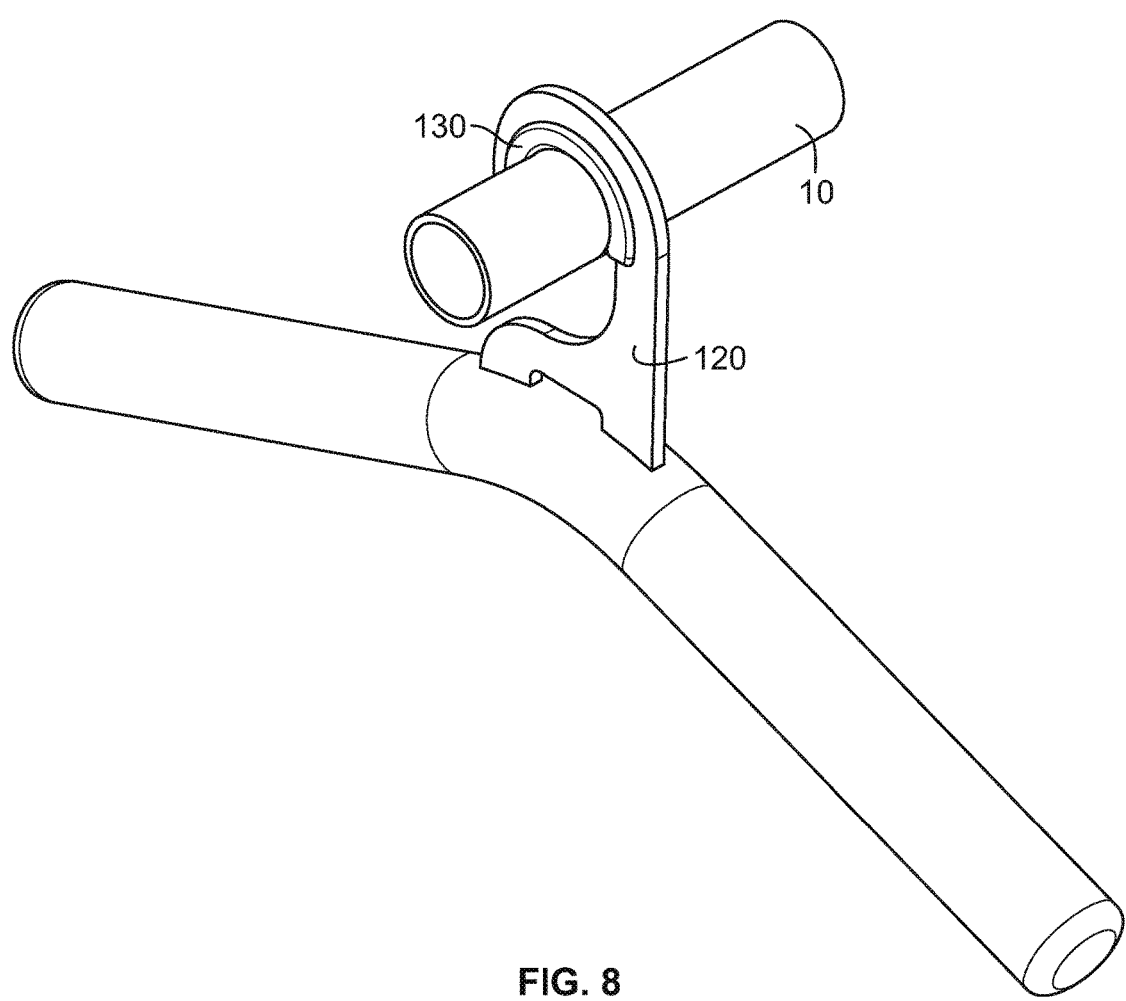
FIG. 8 illustrates another embodiment of the invention showing an arm secured to a hanger.

Continuing to refer to the figures and especially FIG. 4, each arm 120 includes a U-shaped channel 122 formed by having a pair of opposing legs 124 curved into a base 126 of the arm 120. Each leg 124 further includes a free terminal edge 150. Each free terminal edge extending towards each other over a portion of an opening 152 defined by the U-shaped channel 122 between each leg 124 to further define a lip 128. In addition, the free terminal edge 150 of each leg 124 is configured to be contactless. A single liner 130 is fitted within each U-shaped channel 122. The single liner 130 includes a U-shaped profile formed by having a pair of curved members 134 with terminal ends 144 extending towards a base 136 of the single liner. The single liner further includes an outside surface 138 grooved 140 to define a pair of opposing flanges 142 extending from the one terminal end to the other terminal end of the single liner and configured to frictionally engage entirely onto the U-shaped channel 122. When the single liner is installed in the U-shaped channel the lips 128 from each leg 124 extends over the terminal ends 144 of the liner 130 such that a portion of the liner does not extend past the lip of the terminal edges of the U-shaped channel. In addition, the single liner 130 is configured to include an inside surface profile 154 defined to have a shape of a circular major arc 156 to engage a rod 10 (as shown by the intersecting horizontal and vertical centerlines 158, 160 respectively).

In addition to the above, the invention may include providing an arm 120 with a liner 130 as an extension to any product that will secure onto a rod. This may include being able to secure the arm to a floor or wall or even in use with a clothes hanger. When attached to a wall the liner would secure a vertical rod such as a broom or shovel handle or when the liner is secured to the floor a sprinkler pool or other items can be secured.

In one embodiment the liner may be made of a plastic while the holder may be a metal or plastic base. Having a plastic holder would help allow slight deflection when the rod is inserted or removed while also allowing movement without the scratching or pealing of the paint, plating, or coating on the rod.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus for engaging a single rod, the apparatus comprising:
    a single frame configured to be secured to a surface;
    two arms extending from the single frame at a predetermined fixed distance away from each other, each of the two arms including:
        a base; and
        a pair of opposing legs curved into the base;
        wherein each of the pair of opposing legs has a free terminal edge located at a higher elevation than the single frame;
        wherein the base and the pair of opposing legs define a connecting surface and a U-shaped channel, the connecting surface is connected to the single frame, the U-shaped channel defines an opening between the pair of opposing legs, and the opening is arranged substantially perpendicularly to the single frame; and
        wherein a portion of the free terminal edge of each of the pair of opposing legs extends over a portion of the opening to define a lip, and the portions of the free terminal edges of the pair of opposing legs extend towards one another; and
    two liners, each of the two liners fitted into a corresponding one of the two arms, each of the two liners including:
        a base; and
        a pair of curved members;
        wherein the pair of curved members has a first terminal end and a second terminal end;
        wherein the base and the pair of curved members define a U-shaped profile, an outside surface, and a pair of flanges extending from the first terminal end to the second terminal end;
        wherein the outside surface and the pair of flanges define a groove, and the outside surface is configured to frictionally engage entirely onto the U-shaped channel of the corresponding one of the two arms; and
        wherein the base and the pair of curved members define an inside surface profile with a shape of a circular major arc;
    wherein the single frame is arranged entirely between the connecting surfaces of the two arms;
    wherein the two arms extend substantially perpendicularly from the single frame such that the U-shaped channels of the two arms are aligned along a single axis;
    wherein when each of the two liners is installed in the U-shaped channel of the corresponding one of the two arms, the lips of the free terminal edges of the pair of opposing legs of the corresponding one of the two arms extend over the first and second terminal ends of the respective liner such that the respective liner does not extend upwardly past the lips of the free terminal edges of the pair of opposing legs of the corresponding one of the two arms; and
    wherein the two liners fitted within the two arms are configured to engage the single rod.

2. The apparatus of claim 1, wherein each of the pair of opposing legs of each of the two arms extends at about a 15° angle away from the base of a respective one of the two arms.

3. The apparatus of claim 2, wherein each of the pair of curved members of each of the two liners extends at about a 10° angle away from the base of a corresponding one of the two liners.

* * * * *